United States Patent Office 3,274,749
Patented Sept. 27, 1966

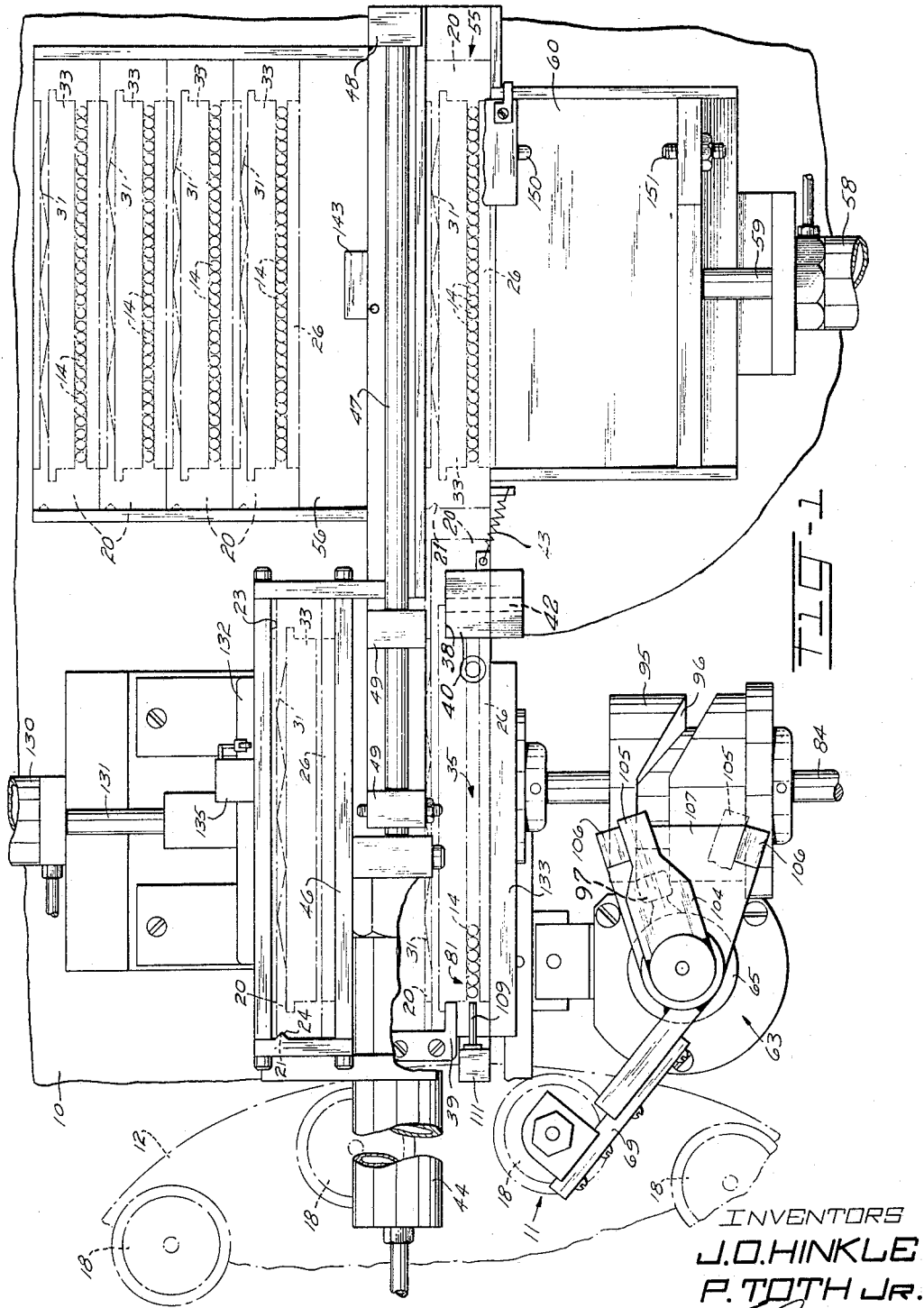

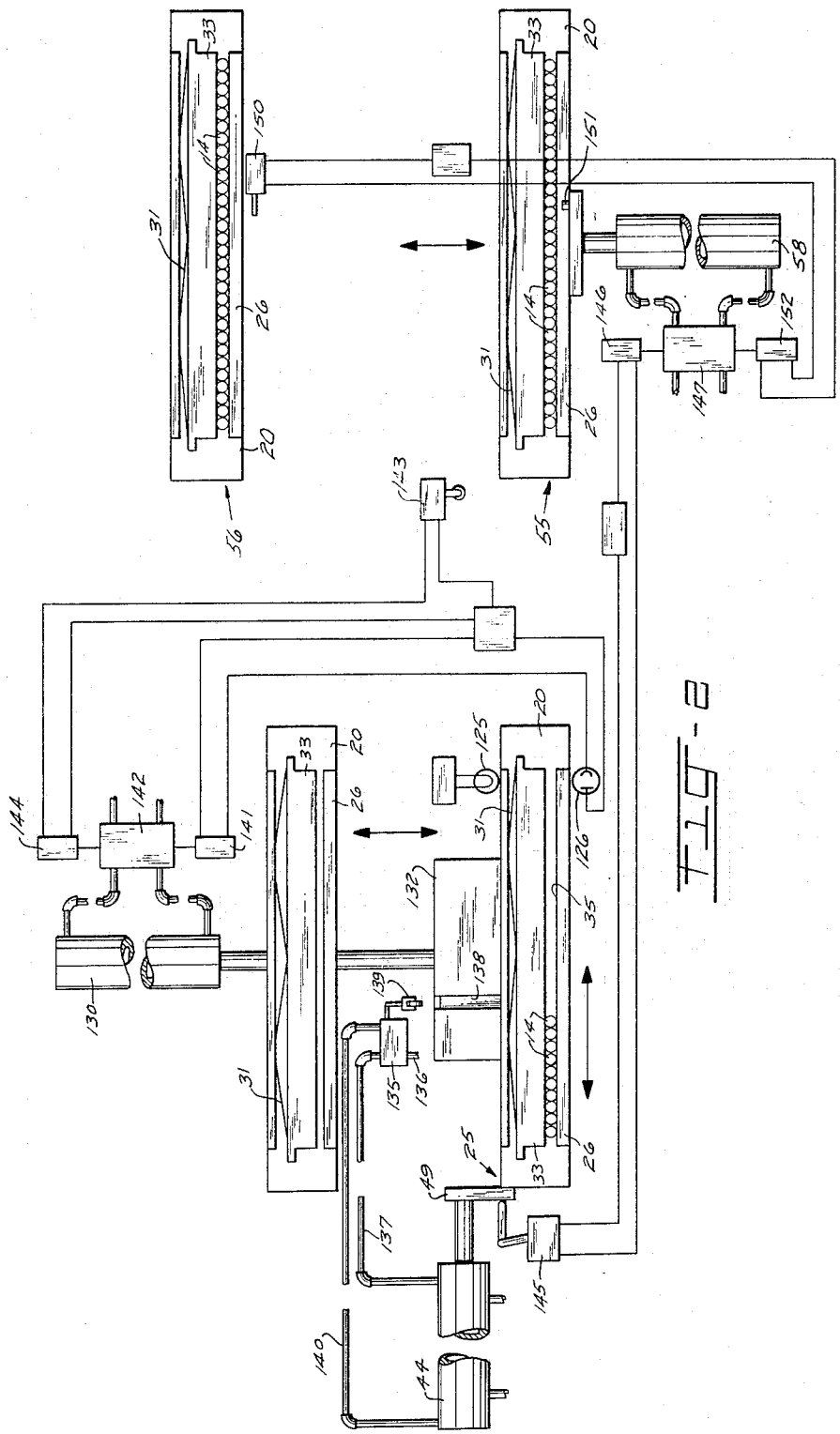

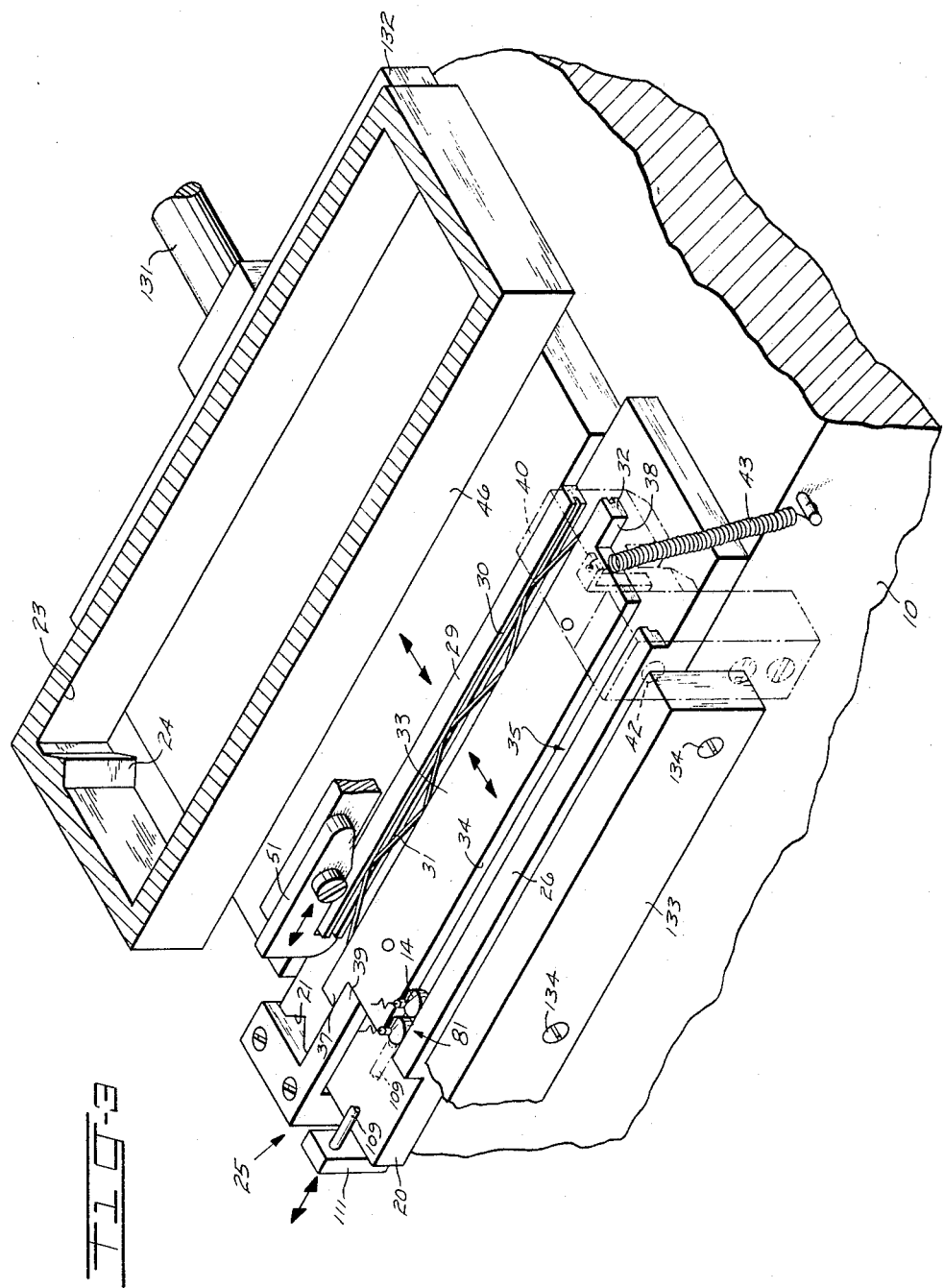

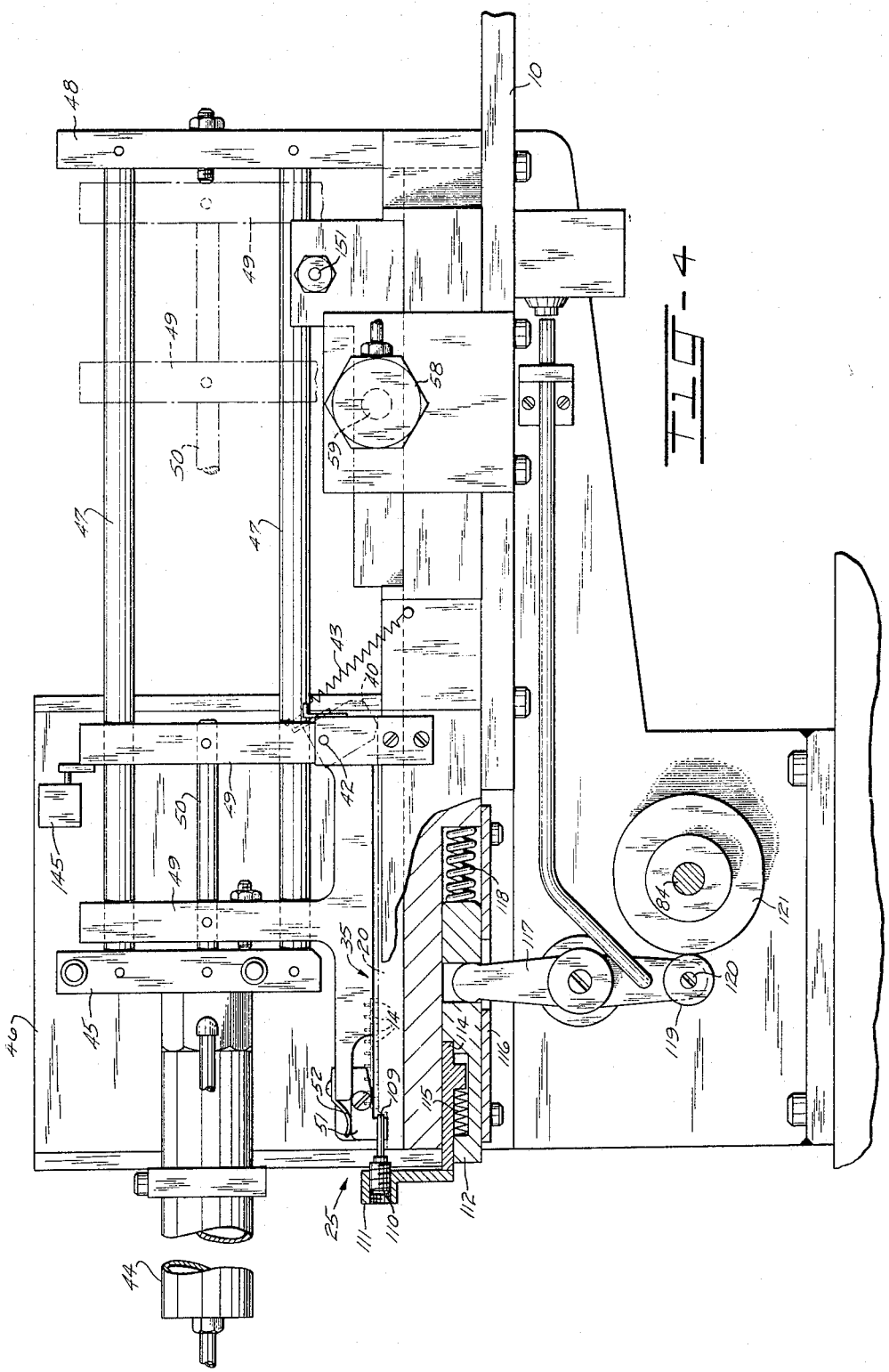

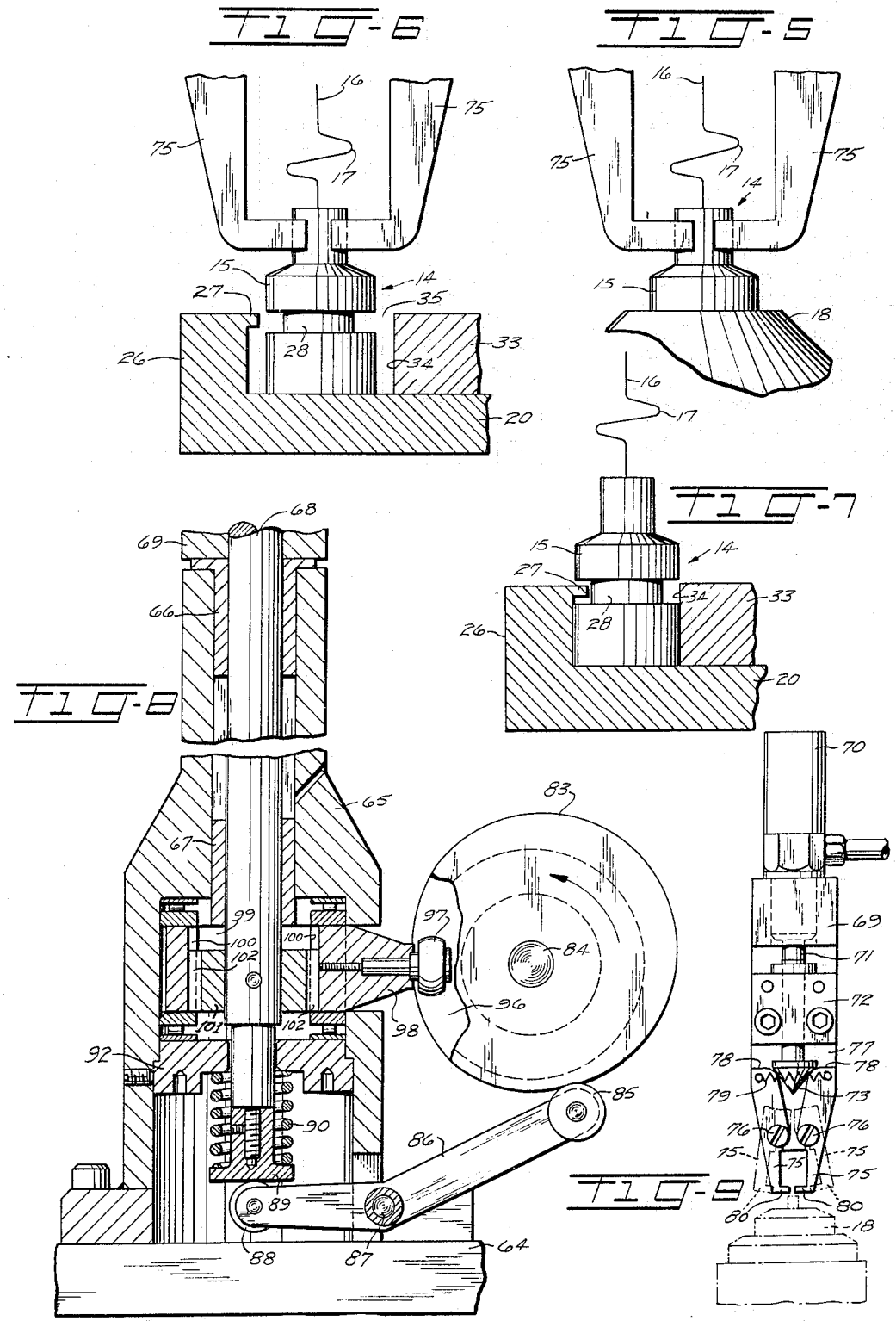

1

3,274,749
ARTICLE UNLOADING AND TRANSFER
APPARATUS
James O. Hinkle, Emmaus, and Peter Toth, Jr., Bethlehem, Pa., assignors to Western Electric Company, Incorporated, New York, N.Y., a corporation of New York
Filed May 29, 1963, Ser. No. 284,192
6 Claims. (Cl. 53—251)

This invention relates to apparatus for unloading articles from holders, particularly chuck-type holders of turret-type machines.

In the manufacture of subassemblies of electrical components, such as diodes, a turret-type machine is used having various stations for performing different operations. Usually, the subassembly parts are indexed from station to station until an unloading station is reached. It is desirable, particularly when working with small components, that the subassemblies be automatically unloaded at the unloading station and loaded into racks or magazines so that they may be conveniently held and transported for further assembly operations.

The object of the present invention is to provide an apparauts, which although simple in structure, is highly efficient in unloading articles from holders moved successively into an unloading station and transferring the articles to a position for loading them into elongated racks.

In accordance with the object the apparatus includes a table fixedly mounted adjacent the unloading station, elongated racks having longitudinally extending article receiving pockets therein and movable on the table from a supply position to a receiving position and a transfer unit operated through successive cycles to remove the articles from the holders when disposed singly in the unloading station and deposit them at a loading position in the pocket of the rack at the receiving position.

More specifically, the transfer unit includes jaws actuable into an open position to receive the articles moved into the unloading station, actuable to a closed position to grip each article and then operable to remove the article from its holder and place it in the loading position of the pocket of the rack. An advancing element is operated after each article is placed in the pocket to advance all of the articles in the pocket until the pocket is filled, at which time control means is operated to move the filled rack from the receiving position to a storing position and move an empty rack into the receiving position.

Other objects and advantages will be apparent from the following detailed description when considered in conjunction with the accompanying drawings wherein:

FIG. 1 is a top plan view of the apparatus shown mounted adjacent an unloading station of a turret having holders for articles thereon;

FIG. 2 is a schematic illustration of the structure shown in FIG. 1 showing particularly the electropneumatic controls;

FIG. 3 is a fragmentary isometric view of a portion of the apparatus;

FIG. 4 is a vertical sectional view of the apparatus;

FIG. 5 is an enlarged fragmentary detailed view showing the jaws of the transfer unit gripping an article in a holder;

FIG. 6 is a fragmentary sectional view of a rack illustrating the depositing of an article in the pocket thereof when the pocket is open;

FIG. 7 is a fragmentary sectional view of a rack illustrating a pocket thereof closed;

FIG. 8 is a fragmentary vertical sectional view of the transfer unit particularly the means for imparting rocking and vertical movements thereto, and

2

FIG. 9 is a front elevational view of the transfer unit illustrating the jaws in open and closed positions.

As shown in FIG. 1 a table 10 is mounted adjacent an unloading station, indicated generally at 11, of a turret 12, which is a part of an article processing machine. In the present instance, the article, shown in FIGS. 5, 6 and 7, indicated generally at 14, is a subassembly of a diode and has a conductive base 15 of the contour shown and a wire 16 with an S-bend 17 therein mounted as illustrated. These articles 14 are small and with the wire 16 formed accurately and mounted therein in the processing machine, it is important that these articles be transported from the subassembly machine of which the turret 12 is a part to a final assembling machine without being subjected to damage. The turret 12 has holders 18 mounted at spaced positions adjacent its periphery and on the upper surface thereof, the turret being driven in a suitable manner intermittently to cause each holder 18 to stop for a given length of time at the unloading station 11.

Numerous racks 20 having V-shaped notches 21 therein are receivable in vertical stacked formation in only the proper position in a hopper 23, this position being assured by a V-shaped projection 24 in one end wall of the hopper receivable in the notches 21 of the racks. The racks are identical in structure and the description of one will apply to all of the racks. The rack shown in the receiving position indicated generally at 25 in FIG. 3, has a front lip 26 shown in FIGS. 6 and 7, and has an inwardly projecting portion 27 adapted to extend into grooves 28 of the portions 15 of the articles 14. An integral back member 29 has a longitudinal groove 30 in its inner surface to receive a zig-zag type of spring 31, which has portions thereof receivable in the groove 30 to hold it in place and other portions receivable in a similar groove 32 in the adjacent edge of an intermediate member 33. The lip 26 and an adjacent surface 34 of the intermediate member 33 serves to form a pocket 35 in the rack, which when open as shown in FIG. 6 will readily receive the articles and when closed as in FIG. 7 will firmly grip a row of articles in the pocket and hold them against displacement. The intermediate member has projections 37 and 38 at opposing ends thereof to respectively engage a fixed stop 39 and a movable stop 40 (FIG. 4). The stops 39 and 40 function to stop the intermediate member 33 against movement, the full distance the other portions of the rack are moved when located in the receiving position 25 (FIG. 3), to cause opening of the pocket 35 to freely receive the articles 14 from the holders 18.

The stop 40, as shown in FIG. 4, is pivotally mounted at 42, normally urged into the path of the projection 38 by a spring 43, but may be moved about its pivot when the rack 20 at the receiving position 25 is loaded and is moved longitudinally to the right. As soon as the force which retains the rack 20 in the receiving position, is moved, the spring 31 moves the rack 20 to cause closing of the pocket 35 as far as possible to cause gripping of the articles 14 deposited in the pocket after which longitudinal movement to the right is imparted to the filled rack at the receiving position by operation of an air cylinder 44 (FIG. 4). The air cylinder 44 is supported by a bracket 45 mounted on a vertical member 46 which is fixed to the table 10. Parallel rods 47 extend between the bracket 45 and a bracket 48 to support a carriage 49 for movement between a starting position, shown in solid lines and an operated position, shown in broken lines in FIG. 4. The carriage 49 is fixed to a piston rod 50 of the air cylinder 44 and carries a pivotally supported finger 51 urged in active position by a spring 52 and adapted to engage the portion 29 of each rack in the receiving position 25 (FIG. 3), and move the rack when loaded into an entrance 55 of a storing area 56. An air cylinder 58 is supported by the table 10 as illustrated in FIG. 1 and has a piston rod 59 with its outer end fixed to a pusher 60 adapted to engage the loaded rack 20 in the entrance 55 of the storage area 56 and move it into the storage area on the table 10 and also advance all of the racks in the storage area to leave room for each rack which follows.

A transfer unit indicated generally at 63, FIGS. 1 and 8, is mounted on a base 64 and includes a housing 65 provided with bearings 66 and 67 for a shaft 68. An arm 69 is fixedly mounted on the shaft 68 and has an air cylinder 70 mounted on the outer end thereof as shown in FIG. 9. A piston rod 71 of the air cylinder 70 is movable vertically in a guide 72 and has a cone-shaped actuator 73 mounted on the lower end thereof. Gripping jaws 75 are pivotally supported at 76 on a portion 77 of the arm 69 and are provided with upper ends 78 normally urged into engagement with the actuator 73 through the force of a spring 79. The lower ends 80 of the jaws 75 are recessed to engage upper portions of the base 15 of each article 14 when moving into the unloading station 11 in its holder 18. The air cylinder 70 is actuated through suitable means (not shown) to cause the actuator 73 to open the jaws 75 prior to movement of each article into the unloading station and to release the jaws to close on the article. The air cylinder 70 is also operated at a return position to release the article at a loading position 81 in the pocket 35 of the rack 20 to allow the article to be located therein. This requires vertical movements of the arm 69 and the gripping jaws 75 relative to the holder 18 at the unloading station 11 and at the loading position 81 of the rack in the receiving position. These vertical movements are brought about through the aid of a cam 83 mounted on a drive shaft 84, which is driven by suitable means (not shown) in timed relation with the driving means for the turret 12, particularly the rest intervals between the driving movements of the turret to remove the article 14 successively from the holders 18. The cam 83, FIG. 8, is of a particular contour to engage a cam follower 85 on a lever 86 pivoted at 87 and carrying a roller 88 to engage a member 89 adjustably secured to the lower end of the shaft 68 to move the shaft axially vertically against the force of a spring 90, which keeps the cam follower 85 in engagement with the periphery of the cam 83. The upper end of the spring 90 engages a plug-like member 92 centrally apertured for the shaft 68.

The means for imparting rocking movement to the shaft 68 causes movement of the arm 69, and therefore the gripping jaws 75, between the two positions, one in alignment with the holder 18 at the unloading station 11 and the other in alignment with the loading position 81 in the pocket 35 of the rack 20 at the receiving position. This means includes a drum-like cam 95 fixedly mounted on the drive shaft 84 and grooved at 96 to receive a cam follower 97. The cam follower 97 is in the form of a roller mounted on a rocking member 98 disposed concentric with the shaft 68 and having a central aperture 99 with key-ways 100 therein to receive a member 101 which is fixed to the shaft 68 and provided with keys 102 to connect the shaft to the rocking member 98 and to permit axial movement of the shaft relative to the rocking member.

Another arm 104 is frictionally fixed to the shaft 68 and has a reduced end 105 movable between stops 106 of a bracket 107 fixed to the housing 65 as shown in FIG. 1. The stops serve to position the jaws 75 of the unit 63 alternately in the unloading and loading positions. As soon as an article 14 has been disposed in the loading position 81, means is actuated to move this article and all of the articles preceding it in the pocket 35 forwardly in the rack so as to eventually load the pocket of the rack. This means includes a pusher 109 adjustably mounted as at 110 in an arm 111 supported by a carriage 112 as illustrated at 114 in FIG. 4. A spring 115 provides a cushioning means for the arm, should anything disturb the advancement of the articles in the pocket of the rack. The carriage 112 is supported at 116 for sliding movement through the actuation of a cam lever 117 and a spring 118. The spring 118 serves to return the carriage 112 to the left to move the pusher 109 away from the pocket 35 and to cause a cam follower 119, mounted at 120 on the cam lever 117 to engage the periphery of a cam 121 mounted on the drive shaft 84. The contour of the cam 121 is such that after each article 14 is disposed at the loading position 81 in the pocket 35 of the rack 20, the pusher 109 will move it to the right a distance somewhat greater than the diameter of the article to allow room for the next article to be disposed in the loading position 81 of the rack. This continues until the rack at the receiving position is loaded, this being determined by the movement of the leading article in the pocket 35 of the rack to interrupt a beam of light from a lamp 125 to a photoelectric cell 126. This results in triggering circuits of a control unit 127 to bring about a series of operations in a predetermined order. The air cylinder 44 has been described for moving the loaded rack 20 from the receiving position shown in the lower left portion of FIGS. 1 and 2 to the entrance 55 of a storing area 56. Furthermore, the air cylinder 58 constitutes the means for moving the loaded rack from the entrance 55 into the storing area 56. An additional air cylinder 130, FIGS. 1 and 2, has a piston rod 131, FIGS. 1 and 3, connected to a slide 132, which serves various purposes, to move the bottom rack 20 in the hopper 23 into the receiving position 25, FIG. 3, to hold the rack in this position, to cause the stops 39 and 40 to function with regard to the intermediate member 33 to open and maintain the pocket 35 open and to support all of the other racks in the hopper 23 against moving downwardly until the slide is returned to its starting position from beneath the hopper. A stop 133 fixed at 134 to a portion of the table 10 serves to locate the successive racks 20 in the receiving position 25.

The electropneumatic controls for the air cylinders 44, 58 and 130 are shown schematically in FIG. 2. A valve 135 connected to an air supply line 136 is normally positioned to connect line 136 to a line 137 of the air cylinder 44 to return the carriage 49 (FIGS. 2 and 4) to and hold it in the starting position. A cam 138 on the slide operates the valve 135 through an arm 139 to connect line 136 to a line 140 to the opposite end of the cylinder 44 for movement of the carriage to move the filled rack 20 to the entrance 55 of the storing area 56. When the rack 20 at the receiving position 25 is loaded and the leading article in the pocket thereof interrupts the light ray from lamp 125 the photoelectric cell 126 will cause operation of solenoid 141 of valve 142 to cause the air cylinder 130 to move the slide 132 to free the loaded rack to close its pocket on the articles and to cause operation of the valve 135 and the cylinder 44 to move the loaded rack to the position 55. While the carriage 49 of the cylinder 44 moves the loaded rack into the entrance 55 the carriage actuates a switch 143 to cause energization of a solenoid 144 to move valve 142 to cause cylinder 130 to move the slide 132 to move an empty rack 20 from the hopper 23 to the receiving position 25. When this is accomplished and the cam 138 on the slide 132 releases the arm 139 the valve 135 operates to cause the cylinder 44 to return the carriage 49 to its starting position. The finger 51 FIG. 3 is caused to pivot and ride on the back member 29 of the rack 20 during this return movement. When the carriage 49 reaches its starting position it operates a switch 145 (FIGS. 2 and 4) closed to energize a solenoid 146 to operate a valve 147 to cause cylinder 58 to move the loaded rack 20 from the entrance 55 to the storing area 56. A switch 150 is operated closed by an adjustable element 151 to energize a solenoid 152 to operate the valve 147 to cause the cylinder 58 to return to its starting position for the next loaded rack.

OPERATION

With the hopper 23 loaded with empty racks 20, suitable means (not shown) may cause operation of the air cylinder 130 to move the bottom rack through movement of the slide 132, into the receiving position 25 where it is held with the pocket 35 open for the articles. Let it be assumed that this is a starting position for the apparatus. The drive shaft 84 is driven in timed relation with the turret 12 and the air cylinder 70 is operated at similar intervals so that the gripping jaws 75 will be open as the next article in its holder 18 is moved into the unloading station 11. When the turret 12 comes to rest the air cylinder 70 is operated to move the actuator 73 downward to close the jaws 75 on the article. Immediately following this action the cam 83 rocks the lever 86, FIG. 8, to the left of the shaft 68 upwardly causing the jaws 75 to pull the article out of its holder and support it while the cam 95 brings about rocking movement of the shaft moving the arm 69 and the jaws 75 from a position in general alignment with the holder at the unloading station into alignment with the receiving position 81. At this time the cam 83 brings about downward movement of the shaft to locate the article in the pocket 35 and at that time the jaws 75 open to release the article. These operations brought about by the cams 83 and 95 cause a succession of transfer of articles from their holders 18 into the pocket 35 of the rack in the receiving position. Furthermore, the cam 121, FIG. 4, is active, following each transfer of an article from its holder 18 to its loading position 81 in the pocket 35, to move the pusher 109 forwardly to advance the article from the loading position and all of the articles preceding it in the pocket 35 until finally the leading article in the pocket interrupts the ray of light from the lamp 125 to the photoelectric cell 126 FIG. 2. This results in operation of valve 142 through energization of solenoid 141 to operate cylinder 130 to move the slide 132 free of the loaded rack. Cam 138 of the slide 132 operates valve 135 to cause the cylinder 44 to move the carriage 49 to move the loaded rack 20 to the entrance 55. Near the end of this movement the carriage 49 operates switch 143 to cause solenoid 144 to actuate valve 142 to cause cylinder 130 and its slide 132 to move an empty rack 20 from the hopper 23 to the receiving position 25 and hold it to open the pocket 35 thereof. When the cam 138 of the slide 132 frees the arm 139 of the valve 135 the cylinder 44 is operated to return the carriage 49 to the starting position. At this time switch 145 causes cylinder 58 to move the loaded rack to the storing area 56 and switch 150 causes the cylinder to return. When the next empty rack is moved into the receiving position the slide 132, moved by the air cylinder 130 holds the empty rack against the stop 133 with sufficient force to hold it against movement. Furthermore, during this action the projections 37 and 38 of the intermediate member of the rack engage their respective stops 39 and 40 to effectively open the pocket 35 of the rack and allow the articles 14 not only to be deposited therein but to be moved longitudinally thereof.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An unloading and transfer apparatus for unloading articles from holders moved successively into an unloading station and transferring the articles to elongated racks comprising:

means for advancing elongated racks one by one in a path normal to the length of the rack to a rack-loading position in which each rack remains stationary until loaded, transfer means having gripping jaws for successively removing articles from the holders and depositing them at one end of an elongated rack advanced to a loading position, pusher means adjacent said one end of a rack so advanced and operable after each article is deposited for sliding the deposited articles along the rack towards the opposite end of the rack, means for detecting when a desired number of articles have been loaded into a rack, and means responsive to said detection for removing the loaded rack from the loading position in a path extending along the length of the rack and for initiating the operation of the advancing means to advance a succeeding rack into the rack-loading position.

2. An unloading and transfer apparatus according to claim 1 characterized in that:

the transfer means includes an arm, the gripping jaws are mounted on the arm, means normally urge the gripping jaws open to receive each article of a holder at the unloading station, and means are operable to close the jaws on each article at the unloading station.

3. An unloading and transfer apparatus according to claim 2 characterized by:

means to cause vertical movement of the arm to cause the closed jaws to remove the article from the holder, and means to cause rocking movement of the arm to transfer the article from the unloading station to the loading position of the pocket.

4. An apparatus for unloading articles from holders moved successively into an unloading station comprising:

a table fixedly mounted adjacent the unloading station, elongated racks having longitudinally extending article receiving pockets therein movable singly on the table from a supply position to a receiving position, a transfer unit operated through successive cycle to remove the articles successively from the holders when disposed singly in the unloading station and deposit them in a loading position in the pocket of the rack at the receiving position, means disposed in each rack to normally close its pocket on articles to hold them in the pocket, and means to cause opening of the pocket of each rack in the receiving position adapting it to receive the articles therein.

5. An apparatus according to claim 4 comprising:

means operable when the pocket of the rack at the receiving station is filled to move said rack out of the receiving position, said means for causing opening of the pocket of the rack at the receiving position being caused to free the pocket to close on the articles during movement of the rack out of the receiving position.

6. An apparatus for unloading articles from holders moved successively into an unloading station comprising:

a table fixedly mounted adjacent the unloading station, elongated racks having longitudinally extending article receiving pockets therein movable singly on the table from a supply position to a receiving position, a transfer unit operated through successive cycles to remove the articles successively from the holders when disposed singly in the unloading station and deposit them in a loading position in the pocket of the rack at the receiving position, a pusher supported for movement relative to the rack in the receiving position and actuated after each operating cycle of the transfer unit to move each article from the loading position and move therewith all preceding articles in the pocket of the rack in the receiving position until the pocket thereof is filled with articles, means responsive to the filling of the rack with articles to move the filled rack out of the receiving position, means operable subsequent to the movement of the filled rack out of the receiving position to move an empty rack into the receiving position, each loaded rack being moved on the table from the receiving position to an intermediate position, and means operated subsequent to movement of each rack into the intermediate position to move said rack and all preceding it on the table away from the intermediate position.

References Cited by the Examiner
UNITED STATES PATENTS

| | | |
|---|---|---|
| 1,850,151 | 3/1932 | Kinney. |
| 2,613,021 | 10/1952 | Bowes _____ 53—249 X |
| 2,661,866 | 12/1953 | Lubbert et al. _____ 53—244 X |
| 2,691,246 | 10/1954 | Roeber. |
| 2,898,721 | 8/1959 | Merrell _____ 53—244 |

FRANK E. BAILEY, *Primary Examiner.*

P. H. POHL, *Examiner.*